United States Patent
Jang et al.

(10) Patent No.: US 10,368,383 B2
(45) Date of Patent: Jul. 30, 2019

(54) APPARATUS AND METHOD FOR PROVIDING MULTIPLE CONNECTIONS USING DIFFERENT RADIO ACCESS TECHNOLOGY IN WIRELESS COMMUNICATION SYSTEM

(71) Applicant: Samsung Electronics Co., Ltd., Suwon-si (KR)

(72) Inventors: Jae-Hyuk Jang, Suwon-si (KR);
Soeng-Hun Kim, Suwon-si (KR);
Sang-Bum Kim, Suwon-si (KR);
Han-Il Yu, Seongnam-si (KR);
Kyeong-In Jeong, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 125 days.

(21) Appl. No.: 14/877,600

(22) Filed: Oct. 7, 2015

(65) Prior Publication Data

US 2016/0100449 A1   Apr. 7, 2016

(51) Int. Cl.
*H04W 76/16* (2018.01)
*H04W 88/06* (2009.01)
*H04W 92/20* (2009.01)

(52) U.S. Cl.
CPC ............ *H04W 76/16* (2018.02); *H04W 88/06* (2013.01); *H04W 92/20* (2013.01)

(58) Field of Classification Search
CPC ... H04W 88/06; H04W 76/025; H04W 76/16; H04W 92/20; H04W 84/12; H04W 84/045

(Continued)

(56) References Cited

U.S. PATENT DOCUMENTS

2012/0142328 A1   6/2012   Awoniyi et al.
2013/0176988 A1   7/2013   Wang et al.
(Continued)

FOREIGN PATENT DOCUMENTS

CN   103650626       3/2014
WO   2011159215 A1   12/2011
(Continued)

OTHER PUBLICATIONS

Communication with European Search Report dated Feb. 22, 2016 corresponding to European Application No. EP15188719.

(Continued)

*Primary Examiner* — Phong La
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. To provide multiple connections, a method of operating a terminal includes receiving a message instructing to establish a second connection based on a second radio access technology (RAT) from a first access node which provides a first connection based on a first RAT, and transmitting a signal for establishing the connection to a second access node using the second RAT.

16 Claims, 16 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2013/0329583 A1* | 12/2013 | Vrzic | .................... | H04W 36/30 |
| | | | | 370/252 |
| 2013/0329694 A1* | 12/2013 | Vrzic | ................. | H04W 36/165 |
| | | | | 370/331 |
| 2014/0010207 A1 | 1/2014 | Horn et al. | | |
| 2014/0079022 A1 | 3/2014 | Wang et al. | | |
| 2014/0082697 A1 | 3/2014 | Watfa et al. | | |
| 2014/0106793 A1* | 4/2014 | Lee | ....................... | H04W 68/12 |
| | | | | 455/458 |
| 2014/0192775 A1 | 7/2014 | Li et al. | | |
| 2014/0194116 A1* | 7/2014 | Jalloul | ................. | H04B 7/0805 |
| | | | | 455/434 |
| 2014/0211776 A1 | 7/2014 | Jang et al. | | |
| 2015/0009801 A1* | 1/2015 | Velde | ................ | H04W 36/0022 |
| | | | | 370/218 |
| 2015/0043486 A1* | 2/2015 | Ozturk | ................ | H04W 76/026 |
| | | | | 370/329 |
| 2015/0257013 A1* | 9/2015 | Patel | ..................... | H04W 16/20 |
| | | | | 370/252 |
| 2015/0264726 A1* | 9/2015 | Zhu | ..................... | H04W 28/065 |
| | | | | 370/329 |
| 2015/0350944 A1* | 12/2015 | Chen | ....................... | H04L 43/08 |
| | | | | 370/252 |
| 2016/0087877 A1* | 3/2016 | Ryu | .................... | H04W 76/026 |
| | | | | 370/329 |
| 2016/0100449 A1* | 4/2016 | Jang | .................... | H04W 76/026 |
| | | | | 370/252 |

FOREIGN PATENT DOCUMENTS

| | | |
|---|---|---|
| WO | WO2011/159215 | 12/2011 |
| WO | 2013010005 A1 | 1/2013 |
| WO | 2013052805 A1 | 4/2013 |
| WO | 2013138708 A1 | 9/2013 |
| WO | 2013152483 A1 | 10/2013 |
| WO | WO2013/152483 | 10/2013 |

OTHER PUBLICATIONS

International Search Report dated Jan. 22, 2016 corresponding to International Application No. PCT/KR2015/010547.
Introduction of Dual Connectivity, R2-144578, 3GPP TSG-RAN2 Meeting #87bis, Shanghai, China, Oct. 6-10, 2014.
Written Opinion dated Jan. 22, 2016 corresponding to International Application No. PCT/KR2015/010547.
Office Action dated Apr. 24, 2018 corresponding to Chinese Application No. CN201510647133.2.
Office Action dated Jun. 11, 2018 corresponding to European Application No. 15 188 719.7.
Chinese Office Action dated Oct. 25, 2018 issued in counterpart application No. 201510647133.2, 19 pages.
Australian Examination Report dated Nov. 2, 2018 issued in counterpart application No. 2015328907, 3 pages.
Chinese Office Action dated Apr. 10, 2019 issued in counterpart application No. 201510647133.2, 20 pages.
Australian Examination Report dated May 14, 2019 issued in counterpart application No. 2015328907, 3 pages.

* cited by examiner

APPARATUS AND METHOD FOR PROVIDING MULTIPLE CONNECTIONS USING DIFFERENT RADIO ACCESS TECHNOLOGY IN WIRELESS COMMUNICATION SYSTEM

RELATED APPLICATION(S)

The present application claims the benefit under 35 U.S.C. § 119(a) to a Korean patent application filed in the Korean Intellectual Property Office on Oct. 7, 2014, and assigned Serial No. 10-2014-0134997, the entire disclosure of which is hereby incorporated by reference.

BACKGROUND

The present disclosure relates generally to multiple connections in a wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A wireless communication system makes great progress in hardware and software so as to provide a better communication quality. For example, a communication technique using a plurality of antennas, rather than a single antenna, is developed, and a technique for restoring a physical signal to data more efficiently is under development.

To satisfy growing demands for high capacity communication, multiple connections are provided. For example, Carrier Aggregation (CA) of a Long Term Evolution (LTE) system can provide multiple connections using a plurality of carriers. Hence, a user can be serviced using more resources.

SUMMARY

To address the above-discussed deficiencies of the prior art, it is a primary aspect of the present disclosure to provide an apparatus and a method for providing multiple connections in a wireless communication system.

Another aspect of the present disclosure is to provide an apparatus and a method for providing multiple connections using different radio access technologies (RATs) in a wireless communication system.

Yet another aspect of the present disclosure is to provide an apparatus and a method for selecting an access node for multiple connections in a wireless communication system.

Still another aspect of the present disclosure is to provide an apparatus and a method for restricting access to an access node for multiple connections in a wireless communication system.

A further aspect of the present disclosure is to provide an apparatus and a method for controlling a status of an access node for multiple connections in a wireless communication system.

A further aspect of the present disclosure is to provide an apparatus and a method for determining whether to provide multiple connections in a wireless communication system.

A further aspect of the present disclosure is to provide an apparatus and a method for determining whether to terminate multiple connections in a wireless communication system.

According to one aspect of the present disclosure, a method of operating a terminal in a wireless communication system includes receiving a message instructing to establish a second connection based on a second RAT from a first access node which provides a first connection based on a first RAT; and transmitting a signal for establishing the connection to a second access node using the second RAT.

According to another aspect of the present disclosure, a method of operating a first access node using a first RAT in a wireless communication system includes transmitting a message instructing to establish a second connection based on a second RAT, to a terminal; and transmitting a part of data destined for the terminal through a first connection based on the first RAT and remaining data to the terminal via a second access node which provides the second connection.

According to yet another aspect of the present disclosure, a method of operating a second access node using a second RAT in a wireless communication system includes receiving a signal for establishing a connection from a terminal; and transmitting data between a first access node using a first RAT and the terminal, to the terminal using the second RAT.

According to still another aspect of the present disclosure, an apparatus of a terminal in a wireless communication system includes a receiver for receiving a message instructing to establish a second connection based on a second RAT from a first access node which provides a first connection based on a first RAT; and a transmitter for transmitting a signal for establishing the connection to a second access node using the second RAT.

According to a further aspect of the present disclosure, an apparatus of a first access node using a first RAT in a wireless communication system includes a wireless communication unit for transmitting a message instructing to establish a second connection based on a second RAT, to a terminal; and a controller for controlling to transmit a part of data destined for the terminal through a first connection based on the first RAT and remaining data via a second access node which provides the second connection.

According to a further aspect of the present disclosure, an apparatus of a second access node using a second RAT in a wireless communication system includes a receiver for receiving a message for establishing a connection from a terminal; and a transmitter for transmitting data between a first access node using a first RAT and the terminal, to the terminal using the second RAT.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
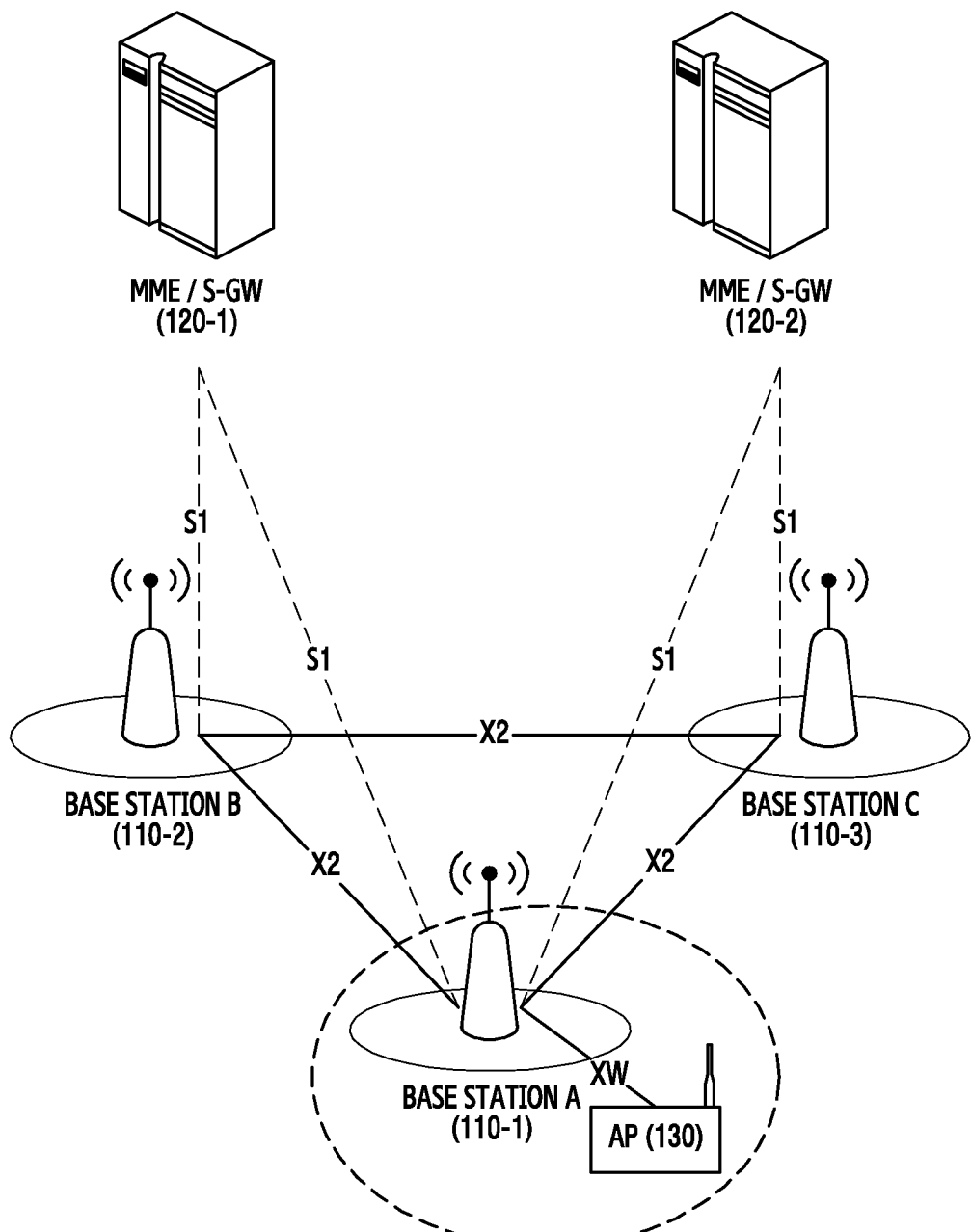
FIG. 1 illustrates a network of a wireless communication system according to an exemplary embodiment of the present disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for providing multiple connections in a wireless communication system.

Hereinafter, a term for identifying an access node, terms for indicating network entities, terms for indicating messages, a term for indicating an interface between the network entities, and terms for indicating various identification information are used to ease the understanding. Accordingly, the present disclosure is not limited to those terms to be explained and can adopt other terms of technically equivalent meanings.

To ease the understanding, the present disclosure uses, but not limited to, terms and names defined in $3^{rd}$ Generation Partnership Project (3GPP) Long Term Evolution (LTE) and Institute of Electrical and Electronics Engineers (IEEE) 802.11 standard. The present disclosure can be equally applied to systems conforming to other standards.

Now, the present disclosure provides multiple connections using a Wireless Local Area Network (WLAN) technology in a cellular communication system. Notably, the present disclosure can employ other radio access technology (RAT), for example, Bluetooth and Bluetooth Low Energy (BLE) besides the WLAN.

FIG. 1 depicts a network of a wireless communication system according to an exemplary embodiment of the present disclosure.

Referring to FIG. 1, the wireless communication system includes a base station (BS) A 110-1, a BS B 110-2, a BS C 110-3, a Mobility Management Entity (MME)/Serving Gateways (S-GWs) 120-1 and 120-2, and an Access Point (AP) 130. While three BSs are depicted, more or less BSs may be included in the wireless communication system. The MME/S-GWs 120-1 and 120-2 each can be divided into the MME and the S-GW.

The BSs 110-1, 110-2, and 110-3 are access nodes of a cellular network and provide radio access to terminals accessing the cellular network. That is, the BSs 110-1, 110-2, and 110-3 support connections between the terminals and a core network (not shown). The core network is a communication network that provides various services to customers who are connected by the access network. For example, the core network may include an Internet protocol (IP) network. The BS A 110-1 can provide multiple connections to a terminal using the AP 130.

The MME/S-GWs 120-1 and 120-2 manage terminal mobility. The MME/S-GWs 120-1 and 120-2 can further manage authentication and bearer of the terminal accessing the cellular network. The MME/S-GWs 120-1 and 120-2 process a packet received from the BS 110 or a packet to be forwarded to the BSs 110-1, 110-2, and 110-3.

The AP 130 is an access node of a WLAN network and provides radio access to the terminals (not shown). In particular, the AP 130 can provide multiple WLAN-based connections to a terminal (not shown) under control of the BS A 110-1. The AP 130 can be included in the BS A 110-1 or connected to the BS A 110-1 via a separate interface. In this case, the BS A 110-1 can transmit a part of downlink data directly to the terminal and the remaining downlink data to the terminal via the AP 130. The terminal can transmit a part of uplink data directly to the BS 110-1 and the remaining uplink data to the AP 130.

The terminal can access the cellular network via the BS A 110-1. The BS A 110-1 can additionally configure the terminal access to the AP 130 and thus control the terminal to communicate in a wider band. In so doing, even when equipment (e.g., MME, S-GW, Packet data Network Gateway (P-GW)) of the core network does not recognize the multiple connections using the AP 130, the service can be still provided.

When the multiple connections are provided via the AP 130, the connection that delivers the data may be determined. For example, in a downlink, the BS A 110-1 can receive data from the core network and determine whether to forward the data over the WLAN or directly to the terminal. In the uplink, the terminal can determine which path to transmit the data to and forward the data to the core network.

Figure 2:
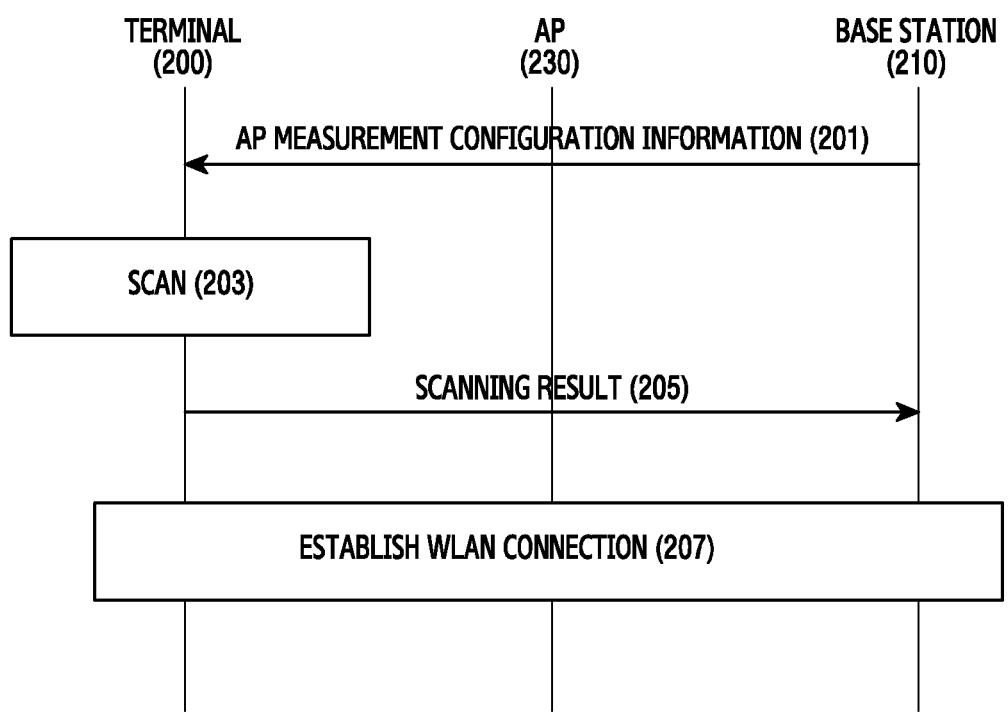
FIG. 2 illustrates a method for establishing a connection with an access node providing an additional connection in a wireless communication system according to an exemplary embodiment of the present disclosure.

FIG. 2 depicts a method for establishing a connection with an access node providing an additional connection in a wireless communication system according to an exemplary embodiment of the present disclosure.

Referring to FIG. 2, in operation 201, a BS 210 (e.g., BS A 110-1 of FIG. 1) transmits AP measurement configuration information to a terminal 200. The AP measurement configuration information can be carried by a control message of a Radio Resource Control (RRC) layer. For example, the AP measurement configuration information can be carried by an RRCConnectionReconfiguration message. The AP measurement configuration information includes information for leading the terminal 200 to access an AP 230 selected by the BS 210. For example, the AP measurement configuration information includes necessary information for scanning the AP 230. More specifically, the AP measurement configuration information can include at least one of an identifier (e.g., Service Set Identification (SSID), Basic Service Set Identification (BSSID)) of the AP 230, an operating frequency of the AP 230, and a signal strength threshold for determining scanning success.

In operation 203, the terminal 200 performs the scanning. That is, the terminal 200 detects a scanning signal received on a WLAN channel so as to discover the AP 230. Before doing so, the terminal 200 can transmit a message requesting the scanning signal. For example, the scanning signal can include a beacon signal or a probe signal. When the operating frequency information is received, the terminal 200 can scan only a channel indicated by the operating frequency information, without having to scan all of WLAN channels. Hence, the scanning time and power can be reduced.

In operation 205, the terminal 200 transmits a scanning result to the BS 210. The scanning result can be delivered by a control message of the RRC layer. For example, the scanning result can be delivered by a MeasurementReport message. The scanning result can include the scanning success or failure of the AP 230, and a signal strength or a signal quality of the AP 230. When detecting access nodes other than the AP 230, the terminal 200 can report discovery and measurement information of the other access nodes to the BS 210. The BS 210 can select one of the detected access nodes including the AP 230 and notify the selected access node to the terminal 200. In FIG. 2, the terminal 200 is assumed to discover the AP 230.

In operation 207, the terminal 200 establishes the WLAN connection. More specifically, the BS 210 transmits to the terminal 200 a message instructing to establish an additional connection via the AP 230, and the terminal 200 and the AP 230 performing signalings and operations to establish the connection. For example, the terminal 200 can send a message requesting the authentication and a message requesting association to the AP 230. Hence, the terminal 200 can establish the multiple connections via the AP 230 in addition to the connection of the BS 210.

Figure 3:
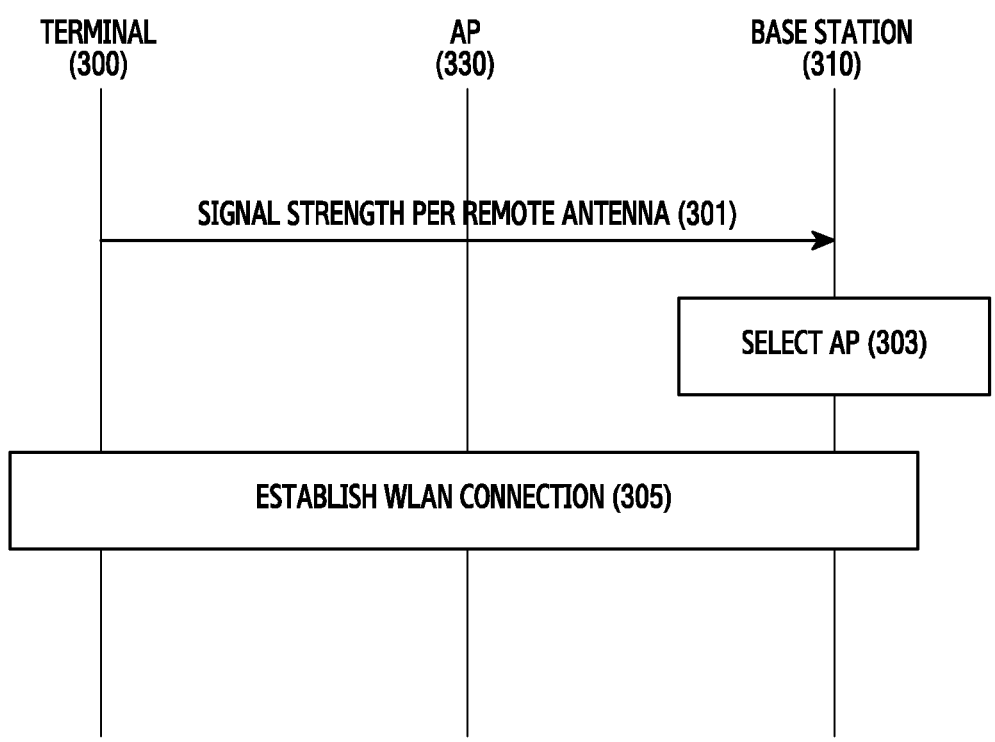
FIG. 3 illustrates a method for establishing a connection with an access node providing an additional connection in a wireless communication system according to another exemplary embodiment of the present disclosure.

FIG. 3 depicts a method for establishing a connection with an access node providing an additional connection in a wireless communication system according to another exemplary embodiment of the present disclosure.

Referring to FIG. 3, in operation 301, a terminal 300 transmits signal strength information per remote antenna to a BS 310. The BS 310 includes a plurality of remote antennas (not shown) distributed over a cell (not shown). The terminal 300 can measure the quality of signals transmitted over the distributed antennas. The signals transmitted over the distributed antennas can be identified based on a signal sequence or a resource location.

In operation 303, the BS 310 selects an access node for providing the additional connection to the terminal 300. The BS 310 knows locations of the remote antennas and controllable WLAN access nodes. Accordingly, the BS 310 can locate the terminal 300 based on the signal strength per remote antenna and determine an access node suitable for the location of the terminal 300. That is, the BS 310 can select the access node near the remote antenna close to the terminal 300. In FIG. 3, it is assumed that an AP 330 is selected.

In operation 305, the terminal 300 establishes the WLAN connection. More specifically, the BS 310 transmits to the terminal 300 a message instructing to establish an additional connection via the AP 330, and the terminal 300 and the AP 330 perform a signaling and operations to establish the connection. The message can be a control message of the RRC layer. For example, the message can be the RRCConnectionReconfiguration message. For example, the terminal 300 can send a message for requesting the authentication and a message for requesting the association to the AP 330. Hence, the terminal 300 can establish the multiple connections via the AP 330 in addition to the connection of the BS 310.

In this embodiment, the BS 310 selects the AP 330 as the access node for providing the additional connection to the terminal 300. According to a yet another embodiment, the BS 310 can select a plurality of access nodes. In this case, the BS 310 can finally select one access node based on the scanning result of the terminal 300 on the access nodes. For doing so, the BS 310 can provide the terminal 300 with access node information, and the terminal 300 can scan the access nodes and transmit the scanning result to the BS 310.

Figure 4:
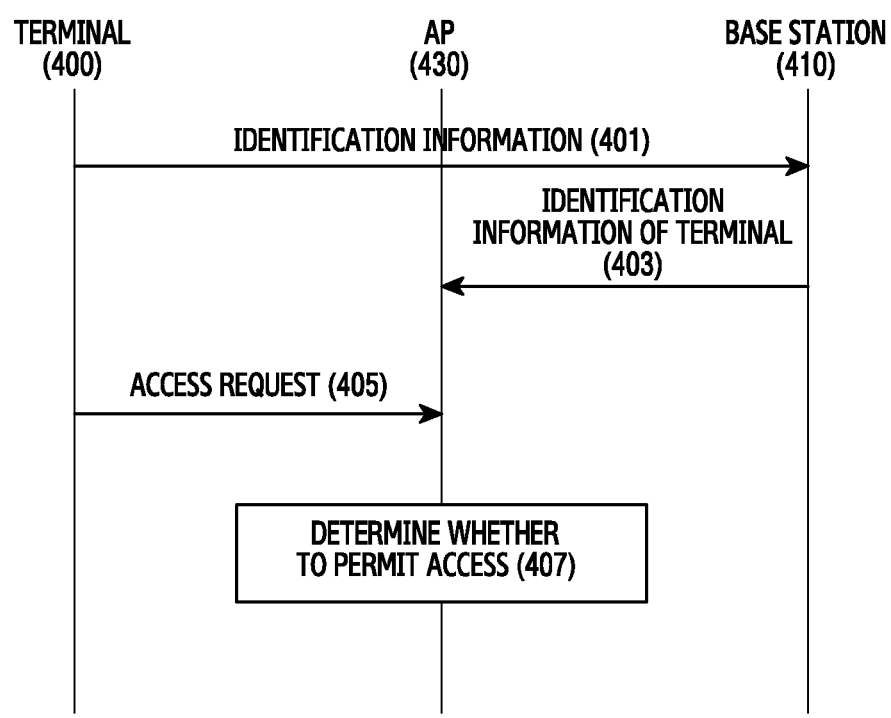
FIG. 4 illustrates a method for restricting access to an access node providing an additional connection in a wireless communication system according to an exemplary embodiment of the present disclosure.

FIG. 4 depicts a method for restricting access to an access node providing an additional connection in a wireless communication system according to an exemplary embodiment of the present disclosure.

Referring to FIG. 4, in operation 401, a terminal 400 transmits identification information for the terminal 400 to a BS 410. The identification information can be carried by a control message of the RRC layer. For example, the identification information can be carried by a UECapabilityInformation message. The identification information includes an identifier used in the WLAN access. For example, the identifier can include a Media Access Control (MAC) address of the terminal 400.

In operation 403, the BS 410 forwards the identification information of the terminal 400 to the AP 430. The BS 410 and the AP 430 can signal with each other using a wired connection between them. The transmitting the identification information can include requesting the AP 430 to permit the access of the terminal of the identification information.

In operation 405, the terminal 400 transmits an access request message to the AP 430. For example, the access request message can include a message for requesting the authentication. Although not depicted in FIG. 4, the terminal 400 can scan the AP 430.

In operation 407, the AP 430 determines whether to permit the access. That is, the AP 430 compares the identification information received from the BS 410 with the identification information of the terminal 400 requesting the access. When the identification information received from the BS 410 matches the identification information of the terminal 400 requesting the access, the AP 430 permits the access of the terminal 400. Next, the WLAN connection may be established.

Figure 5:
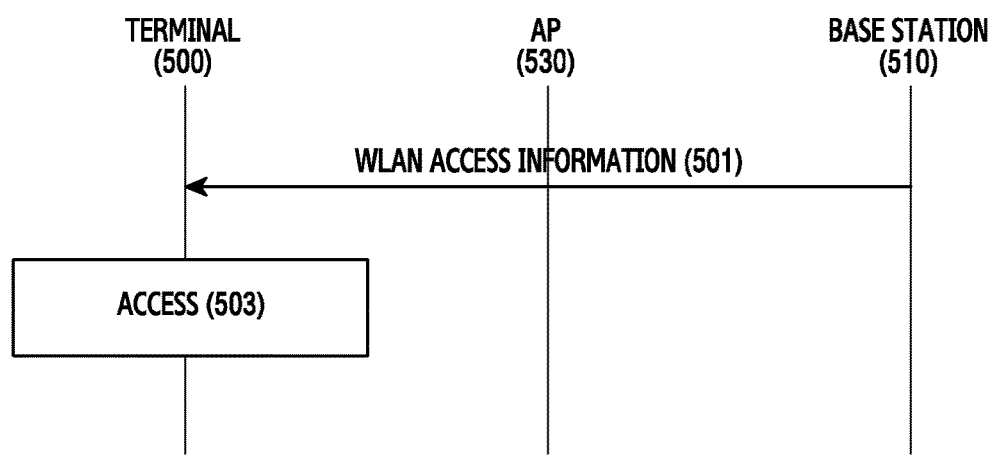
FIG. 5 illustrates a method for restricting access to an access node providing an additional connection in a wireless communication system according to another exemplary embodiment of the present disclosure.

FIG. 5 depicts a method for restricting access to an access node providing an additional connection in a wireless communication system according to another exemplary embodiment of the present disclosure.

Referring to FIG. 5, in operation 501, a BS 510 transmits WLAN access information to a terminal 500. The WLAN access information can be delivered by a control message of the RRC layer. For example, the WLAN access information can be delivered by the RRCConnectionReconfiguration message. The WLAN access information includes information required to access an AP 530. For example, the WLAN access information includes at least one of an identification information (e.g., BSSID) and encryption information (e.g., AP encryption key, access password, etc.) of the AP 530.

In operation 503, the terminal 500 accesses the AP 530. That is, the terminal 500 accesses the AP 530 using the WLAN access information provided from the BS 510. For example, the terminal 500 can scan the access node of the received identification information and access the scanned access node. For doing so, the terminal 500 can transmit a scanning message including the identification information of the AP 530. For example, the scanning message can be a probe request message. When access security is set in the AP 530, the terminal 500 can use the encryption information.

In FIG. 5, only the terminal receiving the access information from the BS 510 can access the AP 530. Accordingly, the AP 530 does not have to inform terminals of a presence of the AP 530 and thus may not transmit the identification information (e.g., SSID). The AP 530 does not respond to the scanning message which is broadcasted, and responds only to the scanning message which is unicast using the identification information for the AP 530. That is, the AP 530 can respond only to an active scanning using a directed probe.

Figure 6:
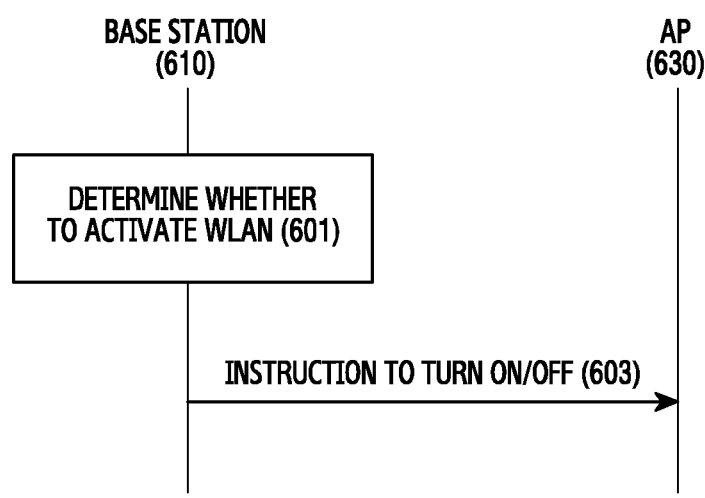
FIG. 6 illustrates a method for controlling a status of an access node for multiple connections in a wireless communication system according to an exemplary embodiment of the present disclosure.

FIG. 6 depicts a method for controlling a status of an access node for multiple connections in a wireless communication system according to an exemplary embodiment of the present disclosure.

Referring to FIG. 6, in operation 601, a BS 610 determines whether to activate the WLAN. When there is no need to provide the multiple connections using the WLAN, unnecessary power consumption can be avoided by turning off an AP 630 being the WLAN access node. For example, the BS 610 can determine whether to activate the WLAN based on at least one of the multi-connection supportability of the accessing terminal and a load level. More specifically, when the load level of the BS 610 falls below a threshold, the BS 610 can determine to turn off the AP 630. In so doing, when a plurality of access nodes is present, the BS 610 can deactivate only some of the access nodes. By contrast, when the load level of the BS 610 exceeds the threshold, the BS 610 can determine to turn on the AP 630. Alternatively, when there is no terminal supporting the multiple connections, the BS 610 can determine to deactivate the AP 630.

In operation 603, the BS 610 transmits a message instructing to turn on/off to the AP 630. The BS 610 and the AP 630 can signal with each other using a wired connection between them. When the deactivation is instructed, the AP 630 can deactivate all or some of functions. For example, the AP 630 can deactivate only the scanning signal transmission and maintain the signal reception, that is, continue to monitor the WLAN channel.

Figure 7:
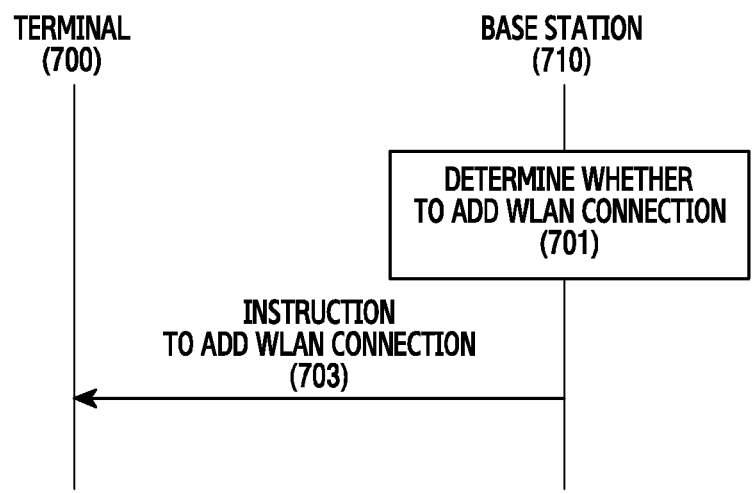
FIG. 7 illustrates a method for instructing to establish an additional connection in a wireless communication system according to an exemplary embodiment of the present disclosure.

FIG. 7 depicts a method for instructing to establish an additional connection in a wireless communication system according to an exemplary embodiment of the present disclosure.

Referring to FIG. 7, in operation 701, a BS 710 determines whether to add the WLAN connection. That is, the BS 710 determines whether to provide the multiple connections to a terminal 700. For example, the BS 710 can determine whether to provide the additional connection based on at least one of a class of a bearer allocated to the terminal 700, a cellular communication quality of the terminal 700, and WLAN preference information received from the terminal 700. The class can be obtained from a Quality of Service (QoS) Class Identifier (QCI). The communication quality can be determined based on a Reference Signal Received Power (RSRP), a Reference Signal Received Quality (RSRQ), and a Sounding Reference Signal (SRS) quality. More specifically, when the channel quality falls below a threshold, the BS 710 can determine to provide the multiple connections to the terminal 700. Alternatively, when a maximum allowable delay of the bearer of the terminal 700 exceeds a threshold, the BS 710 can determine to provide the multiple connections for the corresponding bearer. Alternatively, when a maximum allowable transmission error of the bearer of the terminal 700 exceeds a threshold, the BS 710 can determine to provide the multiple connections for the corresponding bearer. The WLAN preference information can be delivered by a control message (e.g., UECapabilityInformation message) of the RRC layer from the terminal 700 to the BS 710. The WLAN preference information can indicate whether either or both of the cellular communication and the WLAN communication are preferred.

In operation 703, the BS 710 transmits a message instructing to add the WLAN connection to the terminal 700. The message can be a control message of the RRC layer. For example, the message can be the RRCConnectionReconfiguration message. The message can include WLAN connection identification information (e.g., secondary cell ID), information indicating the bearer to be serviced in the WLAN connection, and necessary information (e.g., identification information, encryption information, operating frequency, beacon interval, etc.) for accessing the AP for the WLAN connection.

Figure 8:
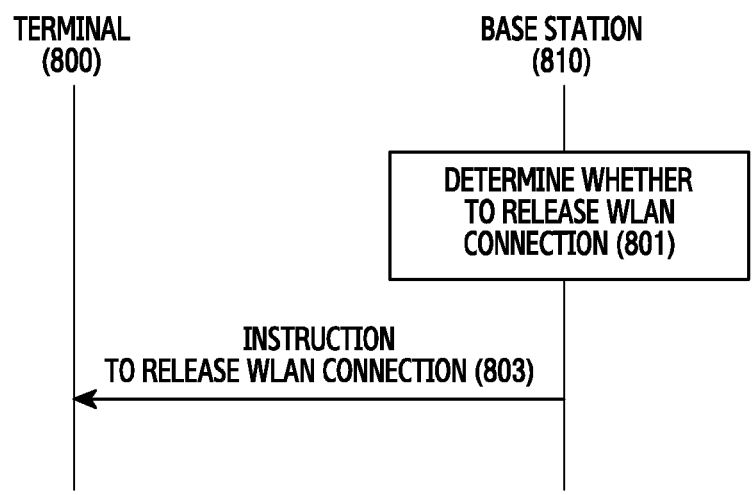
FIG. 8 illustrates a method for instructing to release an additional connection in a wireless communication system according to an exemplary embodiment of the present disclosure.

FIG. 8 depicts a method for instructing to release an additional connection in a wireless communication system according to an exemplary embodiment of the present disclosure.

Referring to FIG. 8, in operation 801, a BS 810 determines whether to disconnect the WLAN. That is, the BS 810 determines whether to cease the multiple connections to a terminal 800. For example, the BS 810 can determine whether to disconnect the WLAN based on at least one of a packet loss rate of the WLAN connection, a modulation and coding scheme (MCS) level of the WLAN connection, a channel quality of the WLAN connection, and a communication quality of the cellular network via the BS 810. More specifically, when a WLAN Acknowledge (ACK) packet for a downlink packet in the WLAN connection is lost over a threshold, the BS 810 can determine to disconnect the WLAN. An AP for providing the WLAN connection can report the WLAN ACK packet loss of the downlink packet to the BS 810. Alternatively, when a WLAN ACK packet for an uplink packet in the WLAN connection is lost over a threshold, the BS 810 can determine to disconnect the WLAN. The terminal 800 can report the WLAN ACK packet loss of the uplink packet to the BS 810. The WLAN ACK packet loss can be carried by a control message (e.g., RadioLinkFailureReport message) of the RRC layer. Alternatively, when the MCS level of the WLAN connection falls below a threshold, the BS 810 can determine to disconnect the WLAN. Alternatively, when the received signal strength of the packet from the terminal 800 to the AP falls below a threshold, the BS 810 can determine to disconnect the WLAN. Alternatively, when the BS 810 resides near the AP and the communication quality of the cellular network falls below a threshold, the BS 810 can determine to disconnect the WLAN. The received signal strength can be determined based on a Received signal Strength Indicator (RSSI), and the communication quality can be determined based on the RSSP, the RSRQ, and the SRS quality.

In operation 803, the BS 810 transmits a message instructing to disconnect the WLAN to the terminal 800. The message can be a control message of the RRC layer. For example, the message can be the RRCConnectionReconfiguration message. The message can include WLAN connection identification information.

Figure 9:
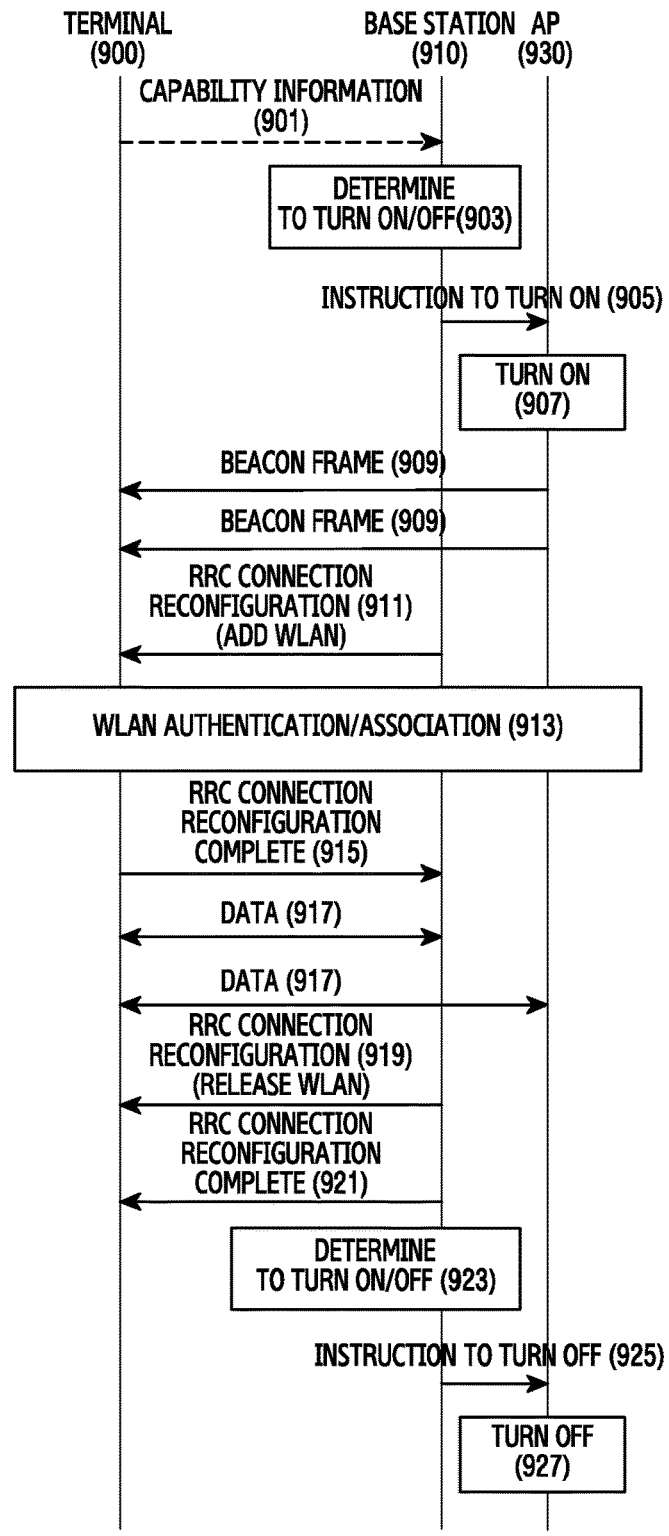
FIG. 9 illustrates a method for controlling multiple connections in a wireless communication system according to an exemplary embodiment of the present disclosure.

FIG. 9 depicts a method for controlling multiple connections in a wireless communication system according to an exemplary embodiment of the present disclosure. In FIG. 9 exemplifies an embodiment where the cellular network conforms to the LTE standard.

Referring to FIG. 9, in operation 901, a terminal 900 transmits capability information to a BS 910. The capability information can be delivered by a control message of the RRC layer. For example, the capability information can be delivered by a UECapabilityInformation message. The capability information can include information indicating hardware capability and supported functions of the terminal 900. The capability information can include information indicating whether the multiple connections using different RATs are supported. For example, the capability information can include the MAC address of the WLAN and an accessible channel frequency band. Although not depicted in FIG. 9, the BS 910 can transmit the capability information to the MME. Hence, when the terminal 900 accesses again, the BS 910 can receive the capability information of the terminal 900 from the MME, not the terminal 900.

In operation 903, the BS 910 determines whether to turn on/off the AP 930. That is, if the AP 930 is deactivated, the BS 910 determines whether to activate the AP 930. For example, the BS 910 can determine whether to activate the AP 930 based on at least one of the multi-connection supportability of the accessing terminals and the load level. More specifically, when the load level of the BS 910 exceeds the threshold, the BS 910 can determine to turn on the AP 930.

In operation 905, the BS 910 instructs the AP 930 to turn on. That is, the BS 910 activates the AP 930.

In operation 907, the AP 930 is turned on. That is, the AP 930 activates the function for providing the additional connection. For example, the AP 930 can apply power to or enable a signal transceiving module.

In operation 909, the AP 930 repeatedly transmits a beacon frame. The AP 930 can periodically transmit the beacon frame at certain time intervals. The beacon frame is a signal for notifying the presence of the AP 930. That is, the beacon frame is used for the terminal 900 to scan the AP 930. For example, the beacon frame can include a time stamp, a beacon interval, capability information of the AP 930, and identification information (e.g., SSID, BSSID, Homogeneous Extended Service Set Identifier (HESSID)) of the AP 930.

In operation 911, the BS 910 transmits an RRCConnectionReconfiguration message to the terminal 900. The RRCConnectionReconfiguration message instructs to add the WLAN connection. For example, the RRCConnectionReconfiguration message can include the WLAN connection identification information (e.g., secondary cell ID), the information indicating the bearer to be serviced in the WLAN connection, and the necessary information (e.g., the identification information, the encryption information, the operating frequency, the beacon interval, etc.) for accessing the AP for the WLAN connection. The RRCConnectionReconfiguration can further include bearer class information to be serviced in the WLAN connection. Although not depicted in FIG. 9, before sending the RRCConnectionReconfiguration message, the BS 910 can determine whether to provide the WLAN connection based on at least one of the class of the bearer allocated to the terminal 900 and the cellular communication quality of the terminal 900.

In operation 913, the terminal 900 performs the WLAN authentication/association. The terminal 900 can access the AP 930 using the information received over the RRCConnectionReconfiguration message. In more detail, the terminal 900 can scan the AP 930 and then send a message requesting the authentication and a message requesting the association to the AP 930. The AP 930 can determine whether to permit the access using the identification information of the terminal 900 received from the BS 910. The terminal 930 can access the AP 930 using the encryption information received over the RRCConnectionReconfiguration message.

In operation 915, the terminal 900 can transmit an RRCConnectionReconfigurationComplete message. That is, the terminal 900 transmits the message notifying the WLAN connected to the AP 930.

In operation 917, the terminal 900 can transmit and receive data to and from the BS 910 over the cellular network and the AP 930 over the WLAN. That is, the terminal 900 transmits and receives data through the connections of the different RATs. That is, the terminal 900 operates in a Carrier Aggregation (CA) mode through the connections of the different RATs. In so doing, the data transmitted and received over the WLAN is a WLAN packet including the packet of the cellular network as a payload. For example, the payload of the WLAN packet can include a packet of a Packet Data Convergence Protocol (PDCP) layer.

In operation 919, the BS 910 transmits an RRCConnectionReconfiguration message to the terminal 900. The RRCConnectionReconfiguration message instructs to disconnect the WLAN. For example, the RRCConnectionReconfiguration message can include the WLAN identification information (e.g., secondary cell ID). Although not depicted in FIG. 9, before sending the RRCConnectionReconfiguration message, the BS 910 can determine whether to disconnect the WLAN based on at least one of the packet loss rate of the WLAN connection, the MCS level of the WLAN connection, the channel quality of the WLAN connection, and the communication quality of the cellular network via the BS 910.

In operation 921, the terminal 900 transmits an RRCConnectionReconfigurationComplete message. That is, the terminal 900 transmits the message notifying the WLAN disconnection from the AP 930.

In operation 923, the BS 910 determines whether to turn on/off the AP 930. That is, if the AP 930 is activated, and the BS 910 determines whether to deactivate the AP 930. For example, the BS 910 can determine whether to deactivate the AP 930 based on at least one of the multi-connection supportability of the accessing terminals and the load level. More specifically, when the load level of the BS 910 falls below the threshold, the BS 910 can determine to turn off the AP 930. Alternatively, when there is no terminal supporting the multiple connections, the BS 910 can determine to turn off the AP 930.

In operation 925, the BS 910 instructs the AP 930 to turn off. That is, the BS 910 deactivates the AP 930.

In operation 927, the AP 930 is turned off. That is, the AP 930 deactivates the function for providing the additional connection. For example, the AP 930 can disable or cut the power of all or a part of the signal transceiving module.

In operation 917 of FIG. 9, the terminal 900 can be serviced using both of the cellular connection and the WLAN connection. In so doing, a plurality of terminals including the terminal 900 can use both of the cellular connection and the WLAN connection. In this case, the BS 910 can perform dynamic scheduling based on at least one of a load, a signal strength, a data type, a user calling plan, a user grade (e.g., best client), AP locations, and a crowded time zone.

Namely, when the BS 910 or the terminal 900 transmits data, the dynamic scheduling determines whether to transmit the data using the cellular connection or the WLAN connection based on current load information, the cellular/WLAN signal strength, or the type or size of the data transmitted/received.

More specifically, when both of the cellular network and the WLAN are used and the load of the BS 910 is considerable, the data delivered in the WLAN connection can increase. By contrast, when the WLAN load is considerable, the data delivered in the cellular connection can increase. Alternatively, when the load of the AP 930 is considerable, the data delivered in the cellular connection can increase. Alternatively, when the WLAN signal strength is relatively higher, the data delivered in the WLAN connection can increase. Alternatively, when the signal strength of the BS 910 is relatively higher, the data delivered in the cellular connection can increase.

In addition, the scheduling can determine whether to transmit data through the cellular connection or the WLAN connection, based on the type of the transceived data. The BS 910 or the terminal 900 can determine the type of the transceived data according to the identification information of the data, and transmit the data over the cellular network of a relatively higher data rate when the data type requires a high data rate. By contrast, when the data type requires a low data rate, that is, when a minimum data rate is relatively low, the data can be transmitted over the WLAN of the relatively low data rate. Thus, when various data are simultaneously transmitted, the data can be effectively delivered in consideration of the network characteristics.

Alternatively, the dynamic scheduling can be conducted based on the user's calling plan information. For example, when the data size exceeds a certain size, the BS 910 can transmit data above a certain size over the WLAN which does not incur the charge. When a subscriber of the terminal 900 can use the cellular network without incurring an additional charge, the data can be transmitted over the cellular network though the data size exceeds the certain size.

As above, when neither of the cellular and WLAN signal strengths are good in the dynamic scheduling, subscriber information can be further used. For example, the load can be distributed by prioritizing a network access right based on the time according to an identifier for identifying the best client, such as the subscriber information of the terminal 900.

In addition, in the dynamic scheduling, when the BS 910 and the AP 930 are managed by one operator or controlled dynamically, the BS 910 can effectively distribute and transceive (transmit and/or receive) data with respect to the terminals which use both of the cellular connection and the WLAN connection. For example, the operator can locate the AP 930 or detect the crowded time zone, calculate the loads of the cellular connection and the WLAN connection based on the location and the time zone, and then conduct the dynamic scheduling based on the calculation.

Figure 10:
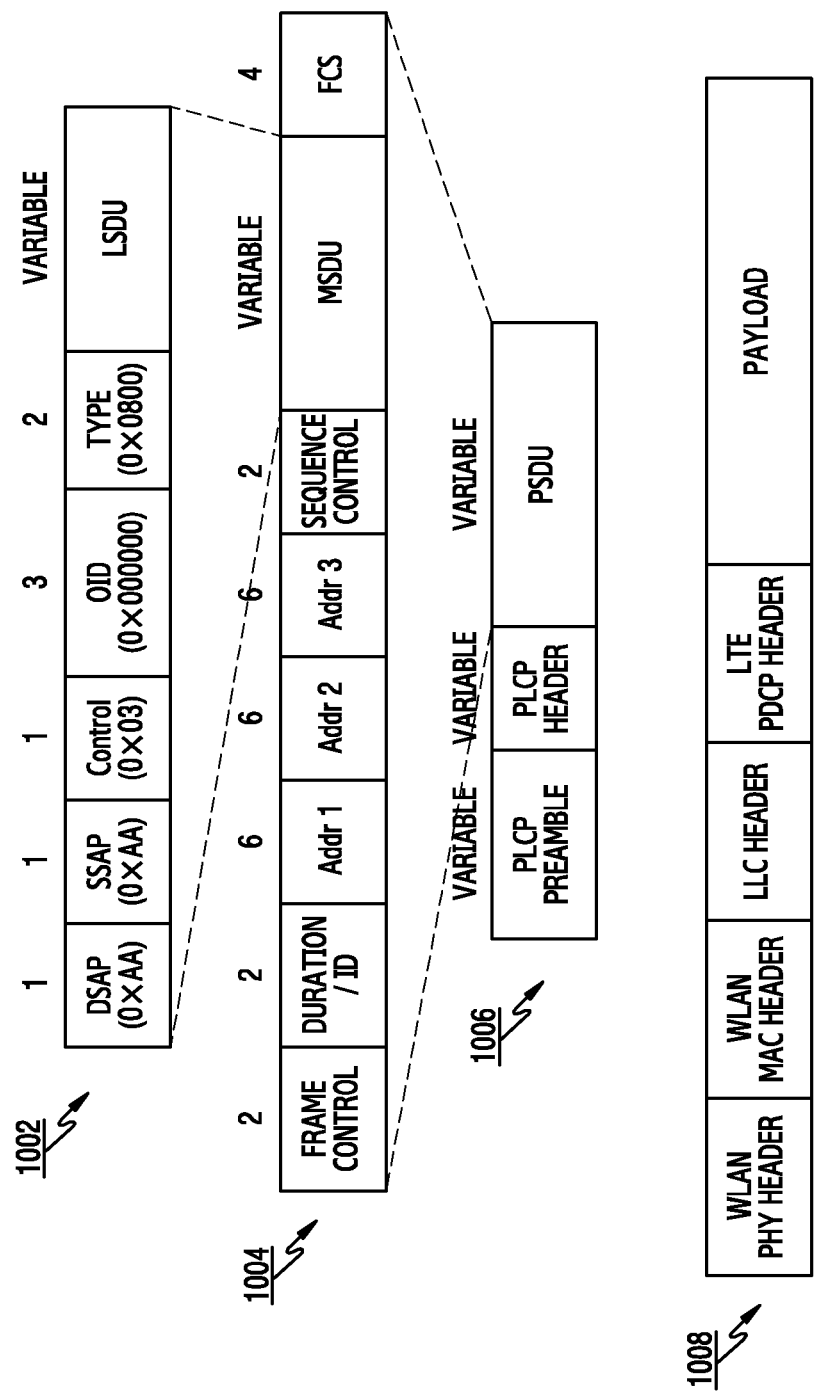
FIG. 10 illustrates a packet delivered through an additional connection in a wireless communication system according to an exemplary embodiment of the present disclosure.

FIG. 10 depicts a packet delivered through an additional connection in a wireless communication system according to an exemplary embodiment of the present disclosure.

Referring to FIG. 10, a Logical Link Control (LLC)/Subnetwork Access Protocol (SNAP) layer packet 1002 of the WLAN includes a Destination Service Access Point (DSAP) field, a Source Service Access Point (SSAP) field, a control field, an Object Identifier (OID) field, a type field, and an LLC Service Data Unit (LSDU). The LSDU contains a packet of the cellular network as the payload, and the type field is set to a value indicating that the cellular network packet is contained in the LSDU. Herein, the cellular network packet can include a packet of the PDCP layer. Yet, the cellular network packet can include a MAC layer packet, a Radio Link Control (RLC) layer packet, or an RCC layer packet.

The MAC layer packet 1004 of the WLAN includes a frame control field, a duration/ID field, address fields, a sequence control field, a MAC Service Data Unit (MSDU) including the LLC/SNAP layer packet 1002, and a Frame Check Sequence (FCS). A Physical (PHY) layer packet 1006 of the WLAN includes a Physical Layer Convergence Procedure (PLCP) preamble, a PLCP header, and a PHY Service Data Unit (PSDU) including the MAC layer packet 1004. Ultimately, a final packet 1008 includes a WLAN PHY header, a WLAN MAC header, an LLC header, an LTE PDCP header, and a payload.

Figure 11:
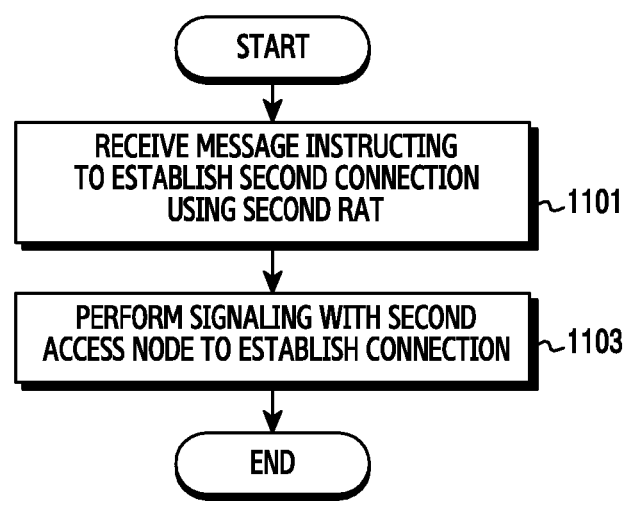
FIG. 11 illustrates operations of a terminal in a wireless communication system according to an exemplary embodiment of the present disclosure.

FIG. 11 illustrates operations of a terminal in a wireless communication system according to an exemplary embodiment of the present disclosure.

Referring to FIG. 11, the terminal receives a message instructing to establish a second connection using a second RAT from a first access node in operation 1101. The first access node is a network entity wirelessly communicating using a first RAT. That is, the terminal can support both of the first RAT and the second RAT and establish the multiple connections using both of the first RAT and the second RAT. For example, the first RAT can conform to the cellular communication standard, and the second RAT can conform to the WLAN communication standard. That is, the terminal establishes the first connection with the first access node using the first RAT and is further instructed to establish the second connection with the second access node. The message can include at least one of identification information for the second connection (e.g., secondary cell ID), information indicating the bearer to be serviced in the second connection, and necessary information (e.g., identification information, encryption information, operating frequency, beacon interval) for accessing the second access node.

In operation 1103, the terminal can signal with the second access node to establish the connection. That is, the terminal sends a signal for establishing the connection to the second access node. More specifically, the terminal can send at least one of a signal for scanning the second access node, a signal for requesting the authentication from the second access node, and a signal for requesting the association with the second access node, and receive at least one response for the transmitted signal. Herein, the scanning signal can include identification information of the second access node.

Next, although not depicted in FIG. 11, the terminal transmits and receives data in the multiple connections including the first connection and the second connection. In so doing, the payload of the data received in the second connection can include a packet of the first RAT.

Although not depicted in FIG. 11, before the operation 1101, the terminal can provide the first access node with the scanning result of at least one access node using the second RAT or the signal quality measurement result per remote antenna of the first access node. Hence, the first access node can determine to provide the second connection via the second access node.

Although not depicted in FIG. 11, the terminal can transmit identification information for the terminal, relating to the second RAT to the first access node. The terminal identification information can be used for the second access node to determine whether to permit the access.

Figure 12:
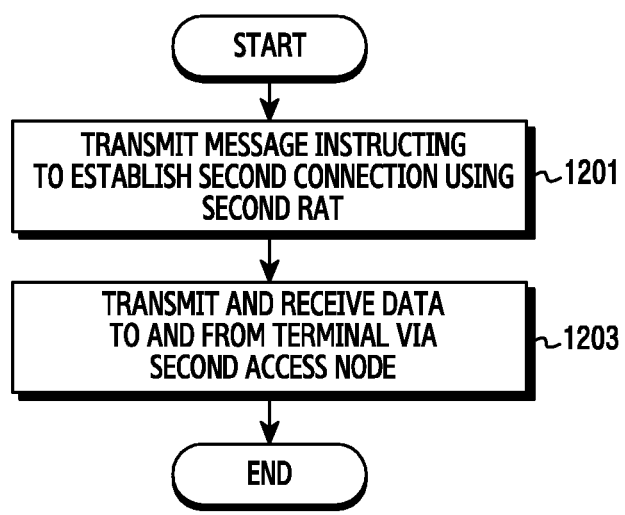
FIG. 12 illustrates operations of a first access node in a wireless communication system according to an exemplary embodiment of the present disclosure.

FIG. 12 illustrates operations of a first access node in a wireless communication system according to an exemplary embodiment of the present disclosure.

Referring to FIG. 12, the first access node sends a message instructing to establish the second connection using the second RAT, to the terminal in operation 1201. The first access node is a network entity wirelessly communicating using the first RAT. That is, the first access node can provide the multiple connections by controlling the second access node supporting the second RAT. For example, the first RAT can conform to the cellular communication standard, and the second RAT can conform to the WLAN communication standard. That is, the first access node establishes the first connection with the terminal using the first RAT and further instructs to establish the second connection with the second access node. The message can include at least one of the identification information for the second connection (e.g., secondary cell ID), the information indicating the bearer to be serviced in the second connection, and the necessary information (e.g., identification information, encryption information, operating frequency, beacon interval) for accessing the second access node.

In operation 1203, the first access node can transmit and receive data to and from the terminal via the second access node. That is, the first access node transmits and receives a part of the data directly in the first connection and the remaining data via the second access node. For example, the first access node can transmit and receive data for at least one of bearers allocated to the terminal, via the second access node. Alternatively, the first access node can transmit and receive a part of data for one bearer via the second access node.

Although not depicted in FIG. 12, before the operation 1201, the first access node can determine whether to provide the multiple connections to the terminal. That is, the first access node can determine whether to instruct the terminal to establish the second connection. For example, the first access node can determine whether to provide the multiple connections based on at least one of the class of the bearer allocated to the terminal and the terminal communication quality.

Although not depicted in FIG. 12, before the operation 1201, the first access node can receive from the terminal, the result of scanning at least one access node using the second RAT or the result of measuring the signal quality per remote antenna of the first access node. Hence, the first access node can determine to provide the second connection via the second access node.

Although not depicted in FIG. 12, the first access node can receive the terminal identification information with respect to the second RAT. The first access node can provide the terminal identification information to the second access node so that the second access node can determine whether to permit the access based on the terminal identification information.

Although not depicted in FIG. 12, the first access node can determine whether to activate/deactivate the second access node. For example, the first access node can determine whether to activate/deactivate the second access node based on at least one of the multi-connection supportability of the accessing terminal and the load level. When the status of the second access node needs to change, the first access node can send the message for turning on/off to the second access node.

Although not depicted in FIG. 12, the first access node can determine whether to terminate the multiple connections of the terminal. That is, the first access node can determine whether to instruct the terminal to release the second connection. For example, the first access node can determine whether to terminate the multiple connections based on at least one of the packet loss rate of the second connection, the MCS level of the second connection, the channel quality of the second connection, and the communication quality of the first connection. In this case, the first access node can send the message instructing to release the second connection.

Although not depicted in FIG. 12, the first access node can perform the dynamic scheduling while both the first connection and the second connection are provided to the terminal. For example, the first access node can distribute the data transmitted to the terminal, to the first connection and the second connection based on at least one of the loads of the first access node and the second access node, the signal strengths of the first access node and the second access node in relation to the terminal, the data type transmitted to the terminal, the calling plan of the terminal user, the terminal subscription information, the location of the second access node, and the crowded time zone.

Figure 13:
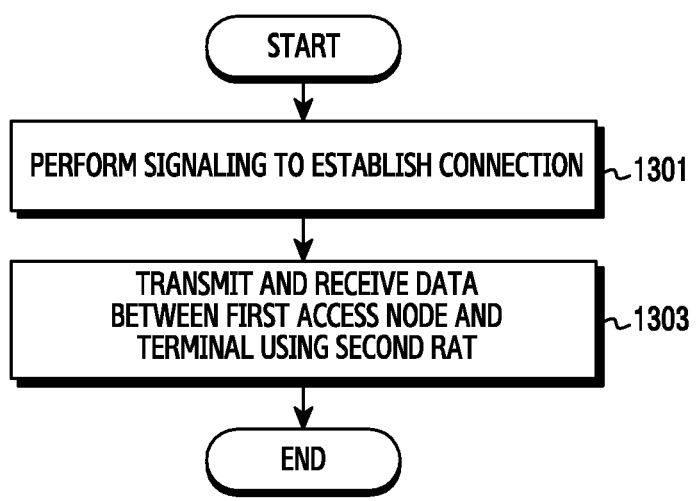
FIG. 13 illustrates operations of a second access node in a wireless communication system according to an exemplary embodiment of the present disclosure.

FIG. 13 illustrates operations of a second access node in a wireless communication system according to an exemplary embodiment of the present disclosure.

Referring to FIG. 13, the second access node signals to establish the second connection with the terminal in operation 1301. The second access node is the network entity wirelessly communicating using the second RAT. That is, the second access node receives the signal for the connection establishment from the terminal. More specifically, the second access node can receive at least one of the signal for scanning the second access node, the signal for requesting the authentication from the second access node, and the signal for requesting the association with the second access node, and send at least one response for the received signal. Herein, the scanning signal can include the identification information of the second access node.

In operation 1303, the second access node forwards data between the first access node and the terminal using the second RAT. That is, the second access node can relay the data between the first access node and the terminal using the second RAT. The first access node is the network entity wirelessly communicating using the first RAT. For example, the first RAT can conform to the cellular communication standard, and the second RAT can conform to the WLAN communication standard. That is, the second access node can provide the second connection using the second RAT under the control of the first access node. The payload of the data transceived with the terminal in the second connection can include the packet conforming to the first RAT.

Although not depicted in FIG. 13, before the operation 1301, the second access node can receive the terminal identification information from the first access node. When the access to the second access node is requested, the second access node can determine whether or not the terminal requests the access based on identification information included in the request signal, and thus reject the request of other terminal than the terminal.

Although not depicted in FIG. 13, the second access node can receive the message instructing to change the status, that is, to turn on/off from the first access node. The second access node can change the status according to the instruction of the message. For example, when the turn-off is instructed, the second access node can deactivate all or a part of the functions.

Figure 14:
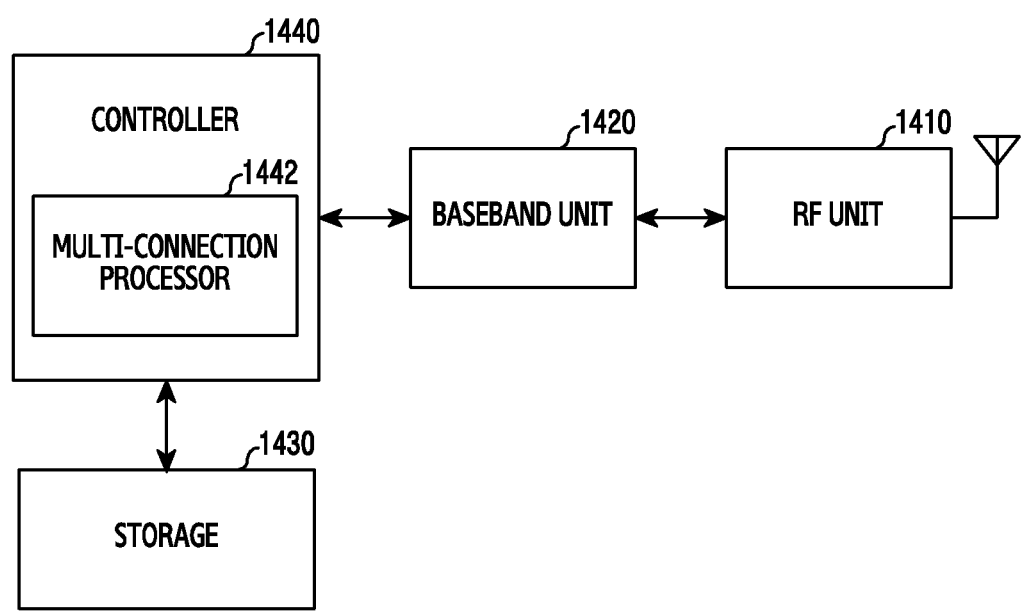
FIG. 14 illustrates a terminal in a wireless communication system according to an exemplary embodiment of the present disclosure.

FIG. 14 is a block diagram of a terminal in a wireless communication system according to an exemplary embodiment of the present disclosure.

Referring to FIG. 14, the terminal includes a Radio Frequency (RF) unit 1410, a baseband unit 1420, a storage 1430, and a controller 1440.

The RF unit 1410 transmits and receives signals over a radio channel through signal band conversion and amplification. That is, the RF unit 1410 up-converts a baseband signal fed from the baseband unit 1420 to an RF signal, transmits the RF signal over an antenna, and down-converts an RF signal received over the antenna to a baseband signal. For example, the RF unit 1410 can include a transmit filter, a receive filter, an amplifier, a mixer, an oscillator, a Digital-to-Analog Converter (DAC), and an Analog-to-Digital Converter (ADC). While only one antenna is depicted in FIG. 14, the terminal can include a plurality of antennas. The RF unit 1410 can include a plurality of RF chains. The RF unit 1410 can conduct beamforming. For the beamforming, the RF unit 1410 can adjust a phase and a magnitude of the signals transmitted and received over the antennas or antenna elements.

The baseband unit 1420 converts a baseband signal and a bit stream according to a physical layer standard of the system. For example, for the data transmission, the baseband unit 1420 generates complex symbols by encoding and modulating the transmit bit stream. For the data reception, the baseband unit 1420 restores the received bit stream by demodulating and decoding the baseband signal fed from the RF unit 1410. For example, in a data transmission based on Orthogonal Frequency Division Multiplexing (OFDM), the baseband unit 1420 generates the complex symbols by encoding and modulating the transmit bit stream, maps the complex symbols to subcarriers, and generates OFDM symbols using Inverse Fast Fourier Transform (IFFT) and Cyclic Prefix (CP) addition. In the data reception, the baseband unit 1420 splits the baseband signal fed from the RF unit 1410 into OFDM symbols, restores the signals mapped to the subcarriers using Fast Fourier Transform (FFT), and restores the received bit stream by demodulating and decoding the signals.

As such, the baseband unit 1420 and the RF unit 1410 transmit and receive the signals. Thus, the baseband unit 1420 and the RF unit 1410 can be referred to as a transmitter, a receiver, a transceiver, a communication unit, or any other similar and/or suitable name for an element that transmits and/or receives signals. Further, at least one of the baseband unit 1420 and the RF unit 1410 can include a plurality of communication modules for supporting different RATs. At least one of the baseband unit 1420 and the RF unit 1410 can include different communication modules for processing signals of different frequency bands. For example, the different RATs can include the WLAN (e.g., IEEE 802.11), the cellular network (e.g., LTE), and so on. The different frequency bands can include a Super High Frequency (SHF) (e.g., 2.5 GHz, 5 GHz) band and a millimeter (mm) wave (e.g., 60 GHz) band.

The storage 1430 stores a basic program for operating the terminal, an application program, and data such as setting information. The storage 1430 store the information about the second access node which wirelessly communicates using the second RAT. The storage 1430 provides the stored data according to a request of the controller 1440.

The controller 1440 controls the operations of the terminal. For example, the controller 1440 sends and receives the signals through the baseband unit 1420 and the RF unit 1410. In addition, the controller 1440 records and reads data in the storage 1430. For doing so, the controller 1440 can include at least one processor. For example, the controller 1440 can include a Communication Processor (CP) for controlling the communication and an application processor for controlling a higher layer such as application program. The controller 1440 includes a multi-connection processor 1442 for operating in a multi-connection mode. For example, the controller 1440 can control the terminal to serve as the terminal as shown in FIGS. 2, 3, 4, 5, 7, 8, and 9 and to perform the operations of FIG. 11. The controller 1440 operates as follows.

The controller 1440 receives the message instructing to establish the second connection using the second RAT from the first access node which wirelessly communicates using the first RAT. The message can include at least one of the identification information (e.g., secondary cell ID) of the second connection, the information indicating the bearer to be serviced in the second connection, and the necessary information (e.g., the identification information, the encryption information, the operating frequency, the beacon interval) for accessing the second access node. Hence, the controller 1440 signals with the second access node to establish the connection. More specifically, the controller 1440 can transmit at least one of the signal for scanning the second access node, the signal for requesting the authentication from the second access node, and the signal for requesting the association with the second access node, and receive at least one response for the transmitted signal. Next, the controller 1440 transmits and receives data in the multiple connections including the first connection and the second connection. In so doing, the payload of the data received in the second connection can include the packet of the first RAT.

According to another embodiment of the present disclosure, the controller 1440 can provide the first access node with the scanning result of at least one access node using the second RAT or the signal quality measurement result per remote antenna of the first access node. According to yet another embodiment of the present disclosure, the controller 1440 can transmit the terminal identification information relating to the second RAT to the first access node. The terminal identification information can be used for the second access node to determine whether to permit the access.

Figure 15:
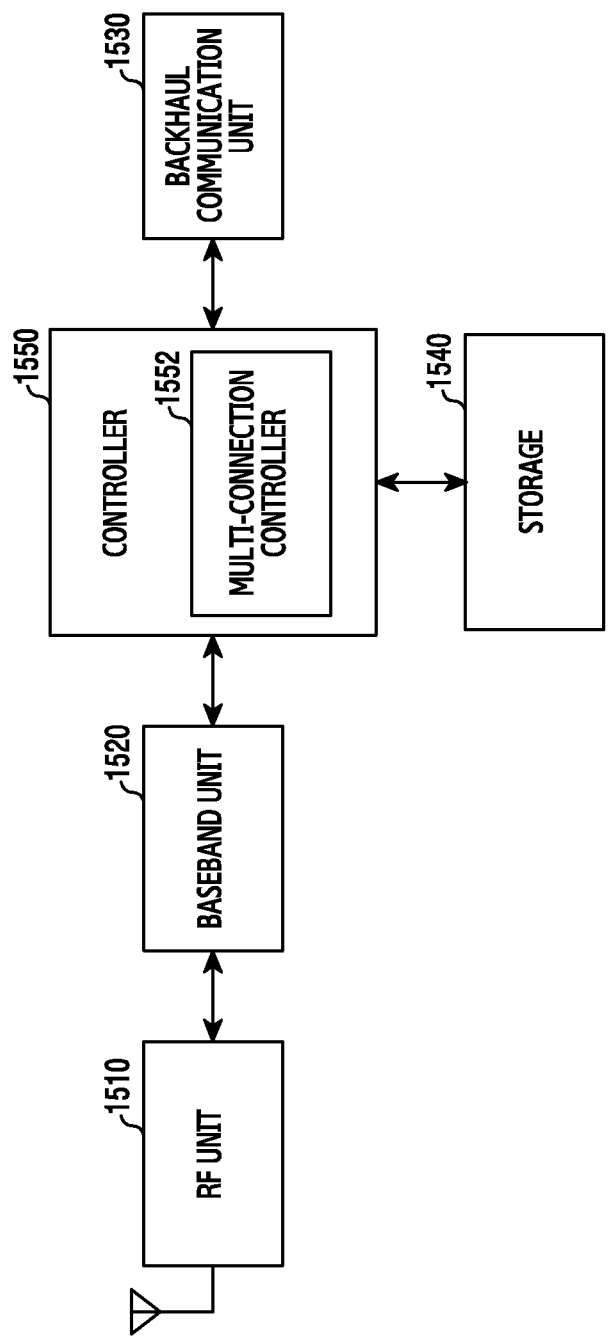
FIG. 15 illustrates a first access node in a wireless communication system according to an exemplary embodiment of the present disclosure.

FIG. 15 is a block diagram of a first access node in a wireless communication system according to an exemplary embodiment of the present disclosure.

Referring to FIG. 15, the first access node includes an RF unit 1510, a baseband unit 1520, a backhaul communication unit 1530, a storage 1540, and a controller 1550.

The RF unit 1510 transmits and receives signals over a radio channel through the signal band conversion and amplification. That is, the RF unit 1510 up-converts a baseband signal fed from the baseband unit 1520 to an RF signal, transmits the RF signal over an antenna, and down-converts an RF signal received over the antenna to a baseband signal. For example, the RF unit 1510 can include a transmit filter, a receive filter, an amplifier, a mixer, an oscillator, a DAC, and an ADC. While only one antenna is depicted in FIG. 15, the first access node can include a plurality of antennas. The RF unit 1510 can include a plurality of RF chains. The RF unit 1510 can conduct the beamforming. For the beamforming, the RF unit 1510 can adjust a phase and a magnitude of the signals transmitted and received over the antennas or antenna elements.

The baseband unit 1520 converts a baseband signal and a bit stream according to a physical layer standard of the first RAT. For example, for the data transmission, the baseband unit 1520 generates complex symbols by encoding and modulating the transmit bit stream. In the data reception, the baseband unit 1520 restores the received bit stream by demodulating and decoding the baseband signal fed from the RF unit 1510. For example, in the data transmission based on the OFDM, the baseband unit 1520 generates the complex symbols by encoding and modulating the transmit bit stream, maps the complex symbols to subcarriers, and generates OFDM symbols using the IFFT and the CP addition. In the data reception, the baseband unit 1520 splits the baseband signal fed from the RF unit 1510 into OFDM symbols, restores the signals mapped to the subcarriers using the FFT, and restores the received bit stream by demodulating and decoding the signals. As such, the baseband unit 1520 and the RF unit 1510 transmit and receive the signals. Thus, the baseband unit 1520 and the RF unit 1510 can be referred to as a transmitter, a receiver, a transceiver, a communication unit, a wireless communication unit, or any other similar and/or suitable name for an element that transmits and/or receives signals.

The backhaul communication unit 1530 provides an interface for communicating with other nodes in the network. That is, the backhaul communication unit 1530 converts the bit stream to be sent from the first access node to other node, for example, to other access node or the core network, into the physical signal and converts the physical signal received from the other node into the bit stream.

The storage 1540 stores a basic program for operating the first access node, an application program, and data such as setting information. Particularly, the storage 1540 can store the bearer information allocated to the accessing terminal and the measurement result reported from the accessing terminal. The storage 1540 can store the information for determining whether to provide or terminate the multiple connections of the terminal. The storage 1540 provides the stored data according to a request of the controller 1550.

The controller 1550 controls the operations of the first access node. For example, the controller 1550 sends and receives the signals through the baseband unit 1520, the RF unit 1510, or the backhaul communication unit 1530. In addition, the controller 1550 records and reads data in the storage 1540. For doing so, the controller 1550 can include at least one processor. For example, the controller 1550 can include a multi-connection controller 1552 for controlling to provide the multiple connections to the terminal. For example, the controller 1550 can control the first access node to serve as the BS as shown in FIGS. 2, 3, 4, 5, 6, 7, 8, and 9 or to conduct the operations of FIG. 12. The controller 1550 operates as follows.

The controller 1550 sends the message instructing to establish the second connection using the second RAT, to the terminal. The message can include at least one of the identification information (e.g., secondary cell ID) of the second connection, the information indicating the bearer to be serviced in the second connection, and the necessary information (e.g., the identification information, the encryption information, the operating frequency, the beacon interval) for accessing the second access node. Next, the controller 1550 transmits and receives a part of the data directly in the first connection using the baseband unit 1520 and the RF unit 1510 and the remaining data via the second access node using the backhaul communication unit 1530. For example, the controller 1550 can transmit and receive the data for at least one of the bearers allocated to the terminal, via the second access node. Alternatively, the controller 1550 can transmit and receive a part of data for one bearer via the second access node.

According to another embodiment of the present disclosure, the controller 1550 can determine whether to provide the multiple connections to the terminal. That is, the controller 1550 can determine whether to instruct the terminal to establish the second connection. For example, the controller 1550 can determine whether to provide the multiple connections based on at least one of the class of the bearer allocated to the terminal and the terminal cellular communication quality.

According to yet another embodiment of the present disclosure, the controller 1550 can receive from the terminal, the result of scanning at least one access node using the second RAT or the result of measuring the signal quality per remote antenna of the first access node. Hence, the controller 1550 can determine to provide the second connection via the second access node.

According to still another embodiment of the present disclosure, the controller 1550 can receive the terminal identification information with respect to the second RAT. The controller 1550 can provide the terminal identification information to the second access node using the backhaul communication unit 1530 so that the second access node can determine whether to permit the access based on the terminal identification information.

According to a further embodiment of the present disclosure, the controller 1550 can determine whether to activate/deactivate the second access node. For example, the controller 1550 can determine whether to activate/deactivate the second access node based on at least one of the multi-connection supportability of the accessing terminal and the load level. When the status of the second access node needs to change, the controller 1550 can send the message for turning on/off to the second access node.

According to a further embodiment of the present disclosure, the controller 1550 can determine whether to terminate the multiple connections of the terminal. That is, the controller 1550 can determine whether to instruct the terminal to release the second connection. For example, the controller 1550 can determine whether to terminate the multiple connections based on at least one of the packet loss rate of the second connection, the MCS level of the second connection, the channel quality of the second connection, and the communication quality of the first connection. In this case, the controller 1550 can send the message instructing to release the second connection.

According to a further embodiment of the present disclosure, the controller 1550 can perform the dynamic scheduling while both of the first connection and the second connection are provided to the terminal. For example, the controller 1550 can distribute the data transmitted to the terminal, to the first connection and the second connection based on at least one of the loads of the first access node and the second access node, the signal strengths of the first access node and the second access node in relation to the terminal, the data type transmitted to the terminal, the calling plan of the terminal user, the terminal subscription information, the location of the second access node, and the crowded time zone.

Figure 16:
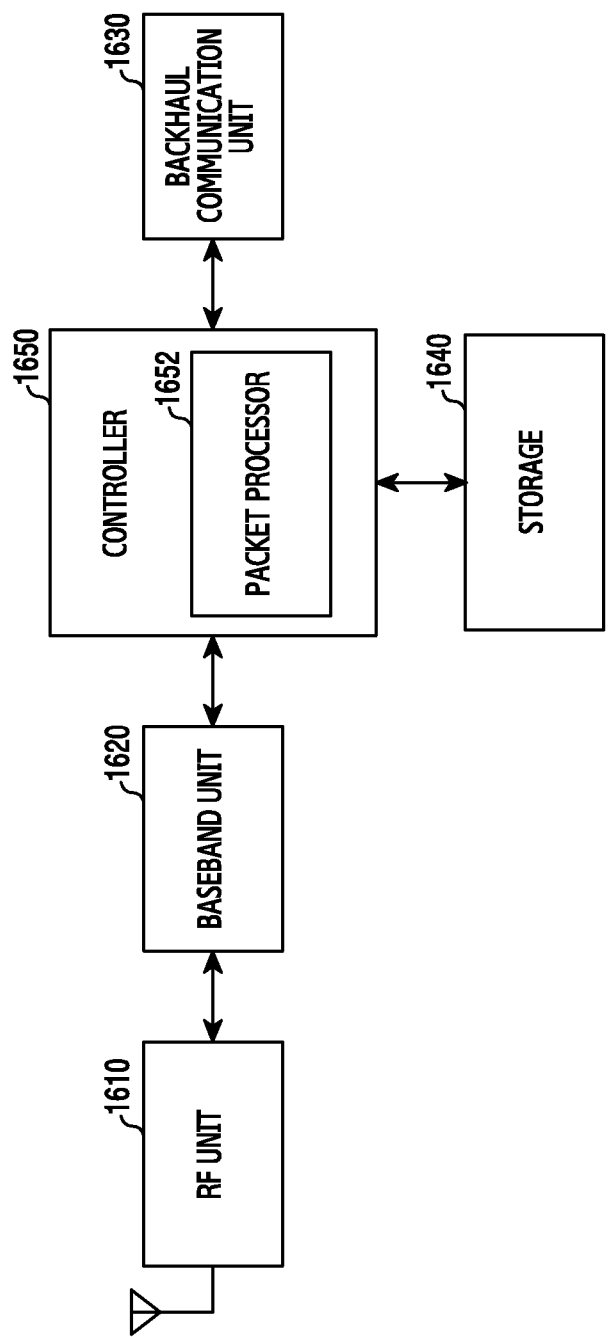
FIG. 16 illustrates a second access node in a wireless communication system according to an exemplary embodiment of the present disclosure.

FIG. 16 is a block diagram of a second access node in a wireless communication system according to an exemplary embodiment of the present disclosure.

Referring to FIG. 16, the second access node includes an RF unit 1610, a baseband unit 1620, a backhaul communication unit 1630, a storage 1640, and a controller 1650.

The RF unit 1610 transmits and receives signals over a radio channel through the signal band conversion and amplification. That is, the RF unit 1610 up-converts a baseband signal fed from the baseband unit 1620 to an RF signal, transmits the RF signal over an antenna, and down-converts an RF signal received over the antenna to a baseband signal. For example, the RF unit 1610 can include a transmit filter, a receive filter, an amplifier, a mixer, an oscillator, a DAC, and an ADC. While only one antenna is depicted in FIG. 16, the second access node can include a plurality of antennas. The RF unit 1610 can include a plurality of RF chains. The RF unit 1610 can conduct the beamforming. For the beamforming, the RF unit 1610 can adjust the phase and the magnitude of the signals transmitted and received via the antennas or antenna elements.

The baseband unit 1620 converts a baseband signal and a bit stream according to a physical layer standard of the second RAT. For example, for the data transmission, the baseband unit 1620 generates complex symbols by encoding and modulating the transmit bit stream. For the data reception, the baseband unit 1620 restores the received bit stream by demodulating and decoding the baseband signal fed from the RF unit 1610. For example, in the data transmission based on the OFDM, the baseband unit 1620 generates the complex symbols by encoding and modulating the transmit bit stream, maps the complex symbols to subcarriers, and generates OFDM symbols using the IFFT and the CP addition. For the data reception, the baseband unit 1620 splits the baseband signal fed from the RF unit 1610 into OFDM symbols, restores the signals mapped to the subcarriers using the FFT, and restores the received bit stream by demodulating and decoding the signals. As such, the baseband unit 1620 and the RF unit 1610 transmit and receive the signals. Thus, the baseband unit 1620 and the RF unit 1610 can be referred to as a transmitter, a receiver, a transceiver, a communication unit, a wireless communication unit, or any other similar and/or suitable name for an element that transmits and/or receives signals.

The backhaul communication unit 1630 provides an interface for communicating with other nodes in the network. That is, the backhaul communication unit 1630 converts the bit stream transmitted from the second access node to other node, for example, to other access node or the core network, into the physical signal and converts the physical signal received from the other node into the bit stream.

The storage 1640 stores a basic program for operating the second access node, an application program, and data such as setting information. Particularly, the storage 1640 can store the bearer information allocated to the accessing terminal and the measurement result reported from the accessing terminal. The storage 1640 can store the information for determining whether to provide or terminate the multiple connections of the terminal. The storage 1640 provides the stored data according to a request of the controller 1650.

The controller 1650 controls the operations of the second access node. For example, the controller 1650 sends and receives the signals through the baseband unit 1620, the RF unit 1610, or the backhaul communication unit 1630. In addition, the controller 1650 records and reads data in the storage 1640. For doing so, the controller 1650 can include at least one processor. The controller 1650 includes a packet processor 1652 for processing the data transmitted and received to and from the terminal operating in the multi-connection mode. The packet processor 1652 can generate and analyze the second RAT packet including the first RAT packet as the payload. For example, the controller 1650 can control the second access node to serve as the AP as shown in FIGS. 2, 3, 4, 5, 6, and 9 or to conduct the operations of FIG. 13. The controller 1650 operates as follows.

The controller 1650 signals to establish the second connection with the terminal. More specifically, the controller 1650 can receive at least one of the signal for scanning the second access node, the signal for requesting the authentication from the second access node, and the signal for requesting the association with the second access node, and send at least one response for the received signal. Next, the controller 1650 forwards data between the first access node and the terminal using the second RAT. In so doing, the payload of the data transceived with the terminal in the second connection can include the first RAT packet.

According to another embodiment of the present disclosure, the controller 1650 can receive the terminal identification information from the first access node through the backhaul communication unit 1630. When the access to the second access node is requested, the controller 1650 can determine whether the terminal requests the access based on identification information included in the request signal and thus reject the request of other terminal than the terminal.

According to yet another embodiment of the present disclosure, the controller 1650 can receive the message instructing to change the status, that is, to turn on/off from the first access node through the backhaul communication unit 1630. The controller 1650 can change the status according to the instruction of the message. For example, when the turn-off is instructed, the controller 1650 can deactivate all or a part of the functions.

As set forth above, the multiple connections using the different RATs in the wireless communication system can provide a high-capacity and high-rate communication service.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:
    transmitting, to a first access node, capability information related to an aggregation operation using a first radio access technology (RAT) and a second RAT;
    receiving, from the first access node, a first message including configuration information for the aggregation operation, the configuration information including a service set identification (SSID) related to a second access node and information regarding an authentication for the second access node;
    performing an association and the authentication with the second access node based on the configuration information;
    receiving data from at least one of the first access node and the second access node based on the aggregation operation;
    receiving, from the first access node, a second message indicating a release of a configuration of the aggregation operation; and
    releasing the configuration of the aggregation operation, in response to the second message,
    wherein the first access node supports the first RAT,
    wherein the second access node supports the second RAT that is different from the first RAT,
    wherein the capability information includes a media access control (MAC) address of the terminal related to the second RAT, and
    wherein data from the second access node includes a packet data unit (PDU) of the first RAT and information indicating that the data includes the PDU of the first RAT.

2. The method of claim 1, wherein the first message comprises at least one of identification information for a connection with the second access node, information indicating a bearer to be serviced in the second connection, and information used to access the second access node.

3. The method of claim 1, wherein the performing an association comprises:
transmitting a signal for establishing a connection with the second access node,
wherein the signal comprises identification information of the second access node.

4. The method of claim 1, further comprising:
receiving, from the first access node, information for scanning the second RAT; and
transmitting, to the first access node, a result of scanning the second RAT.

5. The method of claim 1, further comprising:
transmitting, to the first access node, a result of measuring a signal quality of a plurality of remote antennas of the first access node.

6. The method of claim 1, wherein the first RAT comprises a Long Term Evolution (LTE), and
wherein the second RAT comprises a wireless local area network (WLAN).

7. The method of claim 1,
wherein the MAC address of the terminal is transferred to the second access node from the first access node, before receiving the first message.

8. The method of claim 1, wherein the PDU is a packet data convergence protocol (PDCP) PDU.

9. An apparatus of a terminal in a wireless communication system, the apparatus comprising:
a transceiver configured to transmit and receive signals; and
at least one processor configured to control to:
transmit, to a first access node, capability information related to an aggregation operation using a first radio access technology (RAT) and a second RAT;
receive, from the first access node, a first message including configuration information for the aggregation operation, the configuration information including a service set identification (SSID) related to a second access node and information regarding an authentication for the second access node;
perform an association and the authentication with the second access node based on the configuration information;
receive data from at least one of the first access node and the second access node based on the aggregation operation using a first radio access technology (RAT) and a second RAT;
receive, from the first access node, a second message indicating a release of a configuration of the aggregation operation; and
release the configuration of the aggregation operation, in response to the second message,
wherein the first access node supports the first RAT,
wherein the second access node supports the second RAT that is different from the first RAT,
wherein the capability information includes a media access control (MAC) address of the terminal related to the second RAT, and
wherein data from the second access node includes a packet data unit (PDU) of the first RAT and information indicating that the data includes the PDU of the first RAT.

10. The apparatus of claim 9, wherein the first message comprises at least one of identification information for a connection with the second access node, information indicating a bearer to be serviced in a second connection, and information used to access the second access node.

11. The apparatus of claim 9, wherein the at least one processor is further configured to control the transceiver to transmit a signal for establishing a connection with the second access node,
wherein the signal comprises identification information of the second access node.

12. The apparatus of claim 9, wherein the at least one processor is further configured to control the transceiver to receive information for scanning the second RAT from the first access node, and
the transceiver transmits a result of scanning the second RAT to the first access node.

13. The apparatus of claim 9, wherein the at least one processor configured to control the transceiver to transmit, to the first access node, a result of measuring a signal quality of a plurality of remote antennas of the first access node.

14. The apparatus of claim 9, wherein the first RAT comprises a Long Term Evolution (LTE), and
wherein the second RAT comprises a wireless local area network (WLAN).

15. The apparatus of claim 9, wherein the MAC address of the terminal is transferred to the second access node from the first access node, before receiving the first message.

16. The apparatus of claim 9, wherein the PDU is a packet data convergence protocol (PDCP) PDU.

* * * * *